US00RE34567E

United States Patent [19]

Kraemer et al.

[11] E Patent Number: Re. 34,567

[45] Reissued Date of Patent: Mar. 22, 1994

[54] DEVICE FOR JOINING BY CALENDERING AT LEAST ONE SHEET OF GLASS AND AT LEAST ONE FILM OF PLASTIC MATERIAL

[75] Inventors: Johannes Kraemer, Bietigheim-Biss, Fed. Rep. of Germany; Klemens Leclere, Neu Moresnet, Belgium; Werner Nuding, Bietigheim-Biss; Heinz-Josef Schilde, Wuerselen, both of Fed. Rep. of Germany

[73] Assignee: Saint-Gobain Vitrage, Cedex, France

[21] Appl. No.: 918,144

[22] Filed: Jul. 24, 1992

Related U.S. Patent Documents

Reissue of:

[64] Patent No.: 4,701,240
Issued: Oct. 20, 1987
Appl. No.: 819,256
Filed: Jan. 16, 1986

U.S. Applications:

[63] Continuation of Ser. No. 794,661, Nov. 18, 1991, abandoned, which is a continuation of Ser. No. 425,310, Oct. 20, 1989, abandoned.

[30] Foreign Application Priority Data

Jan. 19, 1985 [DE] Fed. Rep. of Germany ..... 3501631

[51] Int. Cl.[5] ..... B30B 3/04; B32B 31/20

[52] U.S. Cl. ..... 156/555; 156/412; 100/93 RP

[58] Field of Search ..... 92/98 D; 100/93 RP, 100/155 G, 155 R, 211, 269; 156/412, 555, 581, 582

[56] References Cited

U.S. PATENT DOCUMENTS

| | | | |
|---|---|---|---|
| 1,085,818 | 2/1914 | Oxnard | 92/98 D |
| 2,662,564 | 12/1953 | Payzant | 156/555 X |
| 2,983,635 | 5/1961 | Richardson | 156/102 X |
| 3,669,808 | 6/1972 | Klotzbach et al. | 100/155 G X |
| 3,969,991 | 7/1976 | Comstock et al. | 92/98 D X |
| 4,327,634 | 5/1982 | Colmon et al. | 156/582 X |

FOREIGN PATENT DOCUMENTS

| | | | |
|---|---|---|---|
| 2753272 | 5/1979 | Fed. Rep. of Germany | 156/412 |

*Primary Examiner*—David A. Simmons
*Assistant Examiner*—James J. Engel, Jr.
*Attorney, Agent, or Firm*—Oblon, Spivak, McClelland, Maier & Neustadt

[57] ABSTRACT

A calendering device has a plurality of pressure rollers and an opposing plurality of counterpressure rollers, each rotatably mounted on a piston rod movable in a direction for permitting the pressure rollers and counterpressure rollers to approach one another to calender a product. The pistons of the piston rods are mounted within pneumatic casings and are moved by a diaphragm within the pneumatic casings. There is no contact between the pistons and the walls of the pneumatic casings, thereby reducing the frictional resistance to the movement of the rollers. Means are provided for equalizing the pressure applied to a roller and its corresponding counter roller. Separate pneumatic casings and diaphragms may be provided for each piston rod, or several of the pressure rollers or counterpressure rollers may be moved by a single diaphragm, which can be in the form of an elongated hose. In the case of the provision of individual pneumatic casings for each roller, pressure regulating means can be provided for each pair of a pressure roller and its corresponding counterpressure roller.

2 Claims, 7 Drawing Sheets

II
30
24
23
7
21
22
18
16
6
14
33
32
1
5
4
3
10
9
2
11
15
17
19
12
27
28
26
29

30
24
21
23
7
6
22
I
14
32
16
33
14
5
30
1
18
3
4
3
9
31
2
30
10
15
32
11
17
33
15
27
19
28
19
12
26
29
30

3

DEVICE FOR JOINING BY CALENDERING AT LEAST ONE SHEET OF GLASS AND AT LEAST ONE FILM OF PLASTIC MATERIAL

Matter enclosed in heavy brackets [ ] appears in the original patent but forms no part of this reissue specification; matter printed in italics indicates the additions made by reissue.

*This application is a continuation of application Ser. No. 07/794,661, filed on Nov. 18, 1991, now abandoned., which is a continuation of application Ser. No. 07/425,310 filed on Oct. 20, 1989, now abandoned.*

BACKGROUND OF THE INVENTION

1. Field of the Invention

This invention is concerned with a device for joining by calendering at least one sheet of glass and at least one film of plastic material. The device is composed of a series of pressure rollers mounted side-by-side in a flexible manner and cooperating with the pressure rollers, it being understood that the pressure rollers and the counterpressure rollers are each mounted at the extremity of a piston rod, the other extremity of which bears a pressure piston actuated by pneumatic pressure and moving in a pneumatic casing.

2. Discussion of the Related Art

Calendering devices of this type are used particularly in the manufacture of automobile windows of laminated glass which are cylindrically or spherically curved, and serving to calender thicknesses of glass and plastic material to be joined or laminated in such a manner that the air occluded between these layers is expelled as far as possible and that a temporary reciprocal joining of the various layers is obtained. Thanks to their flexible mounting, the position of the individual pressure rollers adapts itself to the particular shape of the laminated window. The final joining together of these layers is effected, after a preliminary pressing operation, in the course of an autoclave process involving high temperature and high pressure.

In the case of a known calendering device of the aforementioned type (U.S. Pat. No. 2,983,635), the pressure required is produced by pneumatic jacks in which the pressure piston is in direct contact with the inside wall of the cylinder of the jack, and in this manner provides tightness for the cylinder chamber into which the pressure is introduced. In the case of this known arrangement, the mobility of the pressure rollers leaves much to be desired, due to the inevitably produced friction, and consequently the risk of breaking is increased during the calendering of the laminated window. Because of the friction of the pressure roller in the cylinder of the jack, it becomes necessary, during a change of the shape of the glass sheet, to first use a relatively great force, to wit, the so-called "tearing" force (difference of the frictional force between the static friction and the sliding friction), in such a manner that the piston overcomes the static friction at the level of the cylinder wall. The tearing force required for the individual pressure rollers may, in this case, assume values exceeding the bending stress permissible for a glass sheet, so that it results in breaking of the glass sheet.

SUMMARY OF THE INVENTION

The invention has as its object to improve a calendering device of the type specified in such a manner that the frictional forces acting in the guiding and securing system of the individual pressure rollers are reduced and the positioning forces thus necessary to change the position of the individual pressure rollers are markedly reduced.

This object is realized according to the invention by providing between each pressure roller and the inside wall of the pneumatic casing surrounding it, a spacing for preventing any direct contact between the piston and the inside wall of the pneumatic casing. Inside the pneumatic casing the space where the chamber may be subjected to pressure is isolated from the pressure piston by a very elastic diaphragm of rubbery material, which, under pressure, fits against the surface of the pressure piston's extremity and, by tightly closing the space between the piston and the inside wall of the pneumatic casing, transmits the pneumatic pressure to the piston.

The individual pressure pistons have no sealing function to perform with regard to the walls surrounding them. As a result, there is no friction loss between the surfaces of the piston and a wall of the cylinder tightly surrounding it. To the contrary, the walls of the piston do not contact the lateral sealing surfaces, but move freely in the pneumatic casing without lateral contact with other surfaces.

The pressure pistons do not necessarily have the shape of pistons in the strictest sense. It suffices if, for example, they have the shape of simple pressure plates which transmit the pressure applied by the diaphragm on the guide rods carrying the pressure rollers.

According to an embodiment of the invention, each individual pressure piston is arranged in its own pneumatic casing which is provided with a highly elastic diaphragm that acts only upon this pressure piston arranged in the pneumatic casing. An advantage of such an arrangement lies in the fact that the pressure applied by each piston rod can be regulated independent of the pressure applied by the neighboring piston rods. In this manner, it is possible, for example, to set a pressure curve by which the pairs of pressure rollers situated in the center of the system exert a stronger pressure than the pairs of lateral pressure rollers, which, if necessary, permits squeezing out the air occluded between the layers.

According to another embodiment of the invention the pressure pistons of several pressure rollers and counterpressure rollers arranged side-by-side can be mounted without mutual contact in a common pneumatic casing, the very elastic diaphragm of which, which closes the pressure fed chamber, acts simultaneously on all the pressure pistons arranged in the common pneumatic casing. In the light of this, the pressure pistons of all the pressure rollers arranged side-by-side, on the one hand, and the pressure pistons of all the counterpressure rollers arranged side-by-side, on the other hand, can be mounted in a common pneumatic casing, and a very elastic diaphragm can be provided inside the pneumatic casing acting simultaneously and jointly on all the pressure pistons of the respective pressure rollers or counterpressure rollers. Such an arrangement presents a simplified structure, on the one hand, while on the other hand it assures in a particularly simple manner that the same pressure will act upon all the pressure and counterpressure rollers. Moreover, this arrangement has the advantage that by virtue of the elimination of the individual pneumatic casings, the pressure pistons can be arranged at the shortest distance from one another in such a way that the pressure rollers can be of a narrower type, which means that for the same width of the calendering device, a larger number of pressure rollers can be provided.

The pressure rollers can be arranged indiscriminately in any spatial arrangement. If the pressure rollers, on the one hand, and the counterpressure rollers, on the other hand, are mounted relative to each other in such a manner that the piston rods carrying the pressure rollers are guided horizontally, a calendering system is obtained in which the laminated window to be joined by calendering traverses the system in a vertical position. Such a system is advantageous, for example, for calendering large and heavy sheets of glass for which, in the case of a horizontal calendering operation, difficulties can arise due to the heavy weight of the glass sheets themselves.

Smaller sheets of glass, for example, of the size of windshields of automotive vehicles, are advantageously calendered in a horizontal position in such a manner that the pressure rollers, on the one hand, and the counterpressure rollers, on the other hand, are mounted side-by-side, and that the piston rods run in an essentially vertical direction. In the case of such an arrangement of the pressure rollers, where the piston rods move in the vertical direction or in an essentially vertical direction, it is advantageously possible to compensate for the vertical force components produced by the weight of the guiding equipment of the pressure rollers and/or of the counterpressure rollers. In the case of an exact weight compensation, it is possible that the pressure rollers remain in the height position they respectively occupy, which markedly facilitates the operation of inserting a curved or bent sheet of glass between the pressure rollers, for example. Pneumatic springs with an essentially linear working curve are particularly suitable for the proper weight compensation of the pressure rollers and/or the counterpressure rollers.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
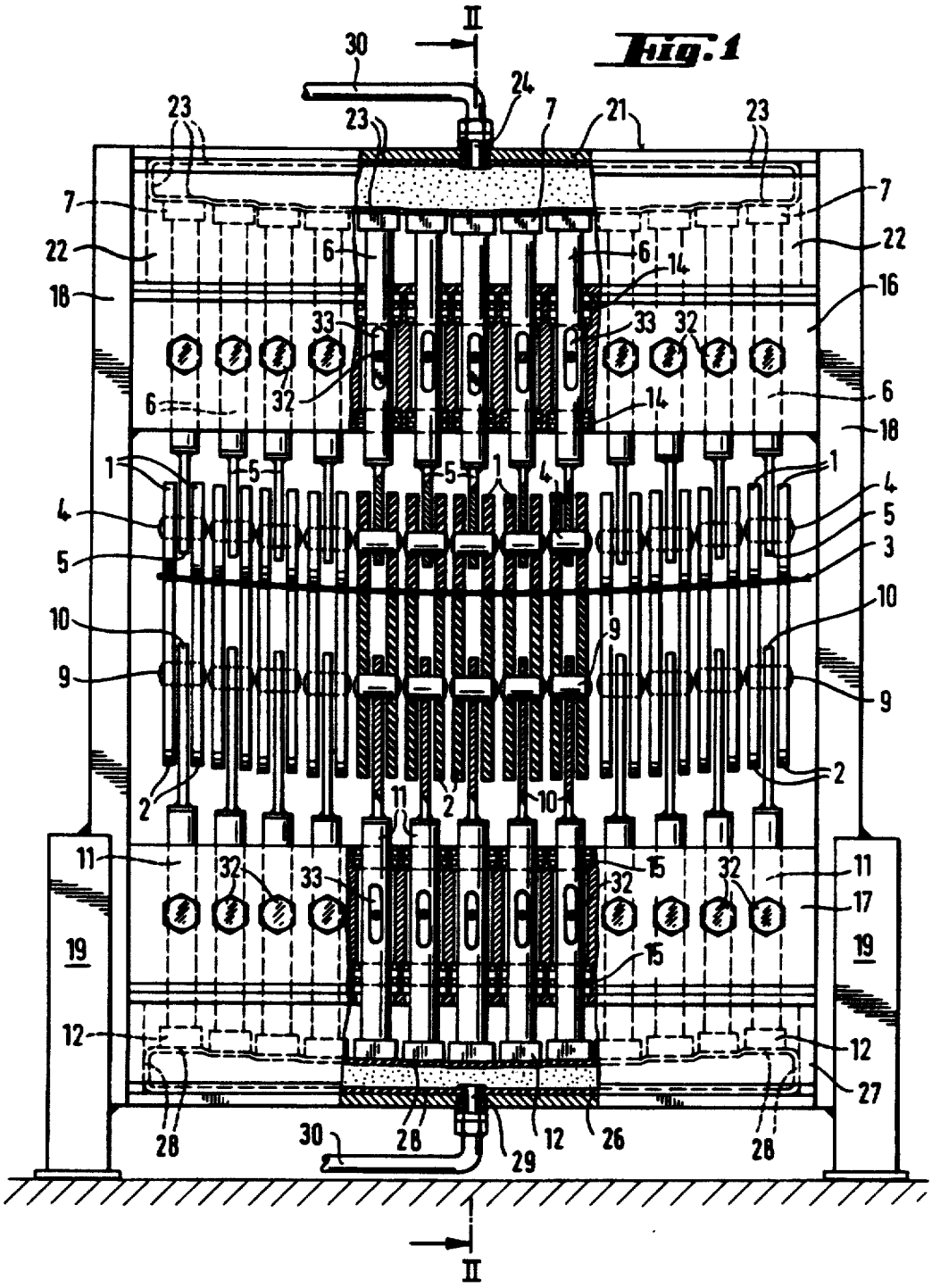
FIG. 1 is a front elevation view of a calendering device of the invention having a common pneumatic casing for all the pressure rollers and another common pneumatic casing for all the counterpressure rollers.

In the calendering devices shown in the drawings, the axes of rotation of the rollers 1, 2 are in substances directed horizontally, and the pressure rollers 1 as well as the counterpressure rollers 2 cooperating with them are arranged one above the other. The product 3 to be laminated by compression is in this case inserted in an approximately horizontal position between the pressure rollers 1, 2. However, it is also possible to use a system in which the axes of rotation of the pressure rollers extend vertically or at another angle in such a manner that the product to be laminated by compression is inserted between the pressure rollers in a vertical position or in another angular position, if for any reason whatsoever this arrangement should prove advantageous.

Figures 2, 2A:
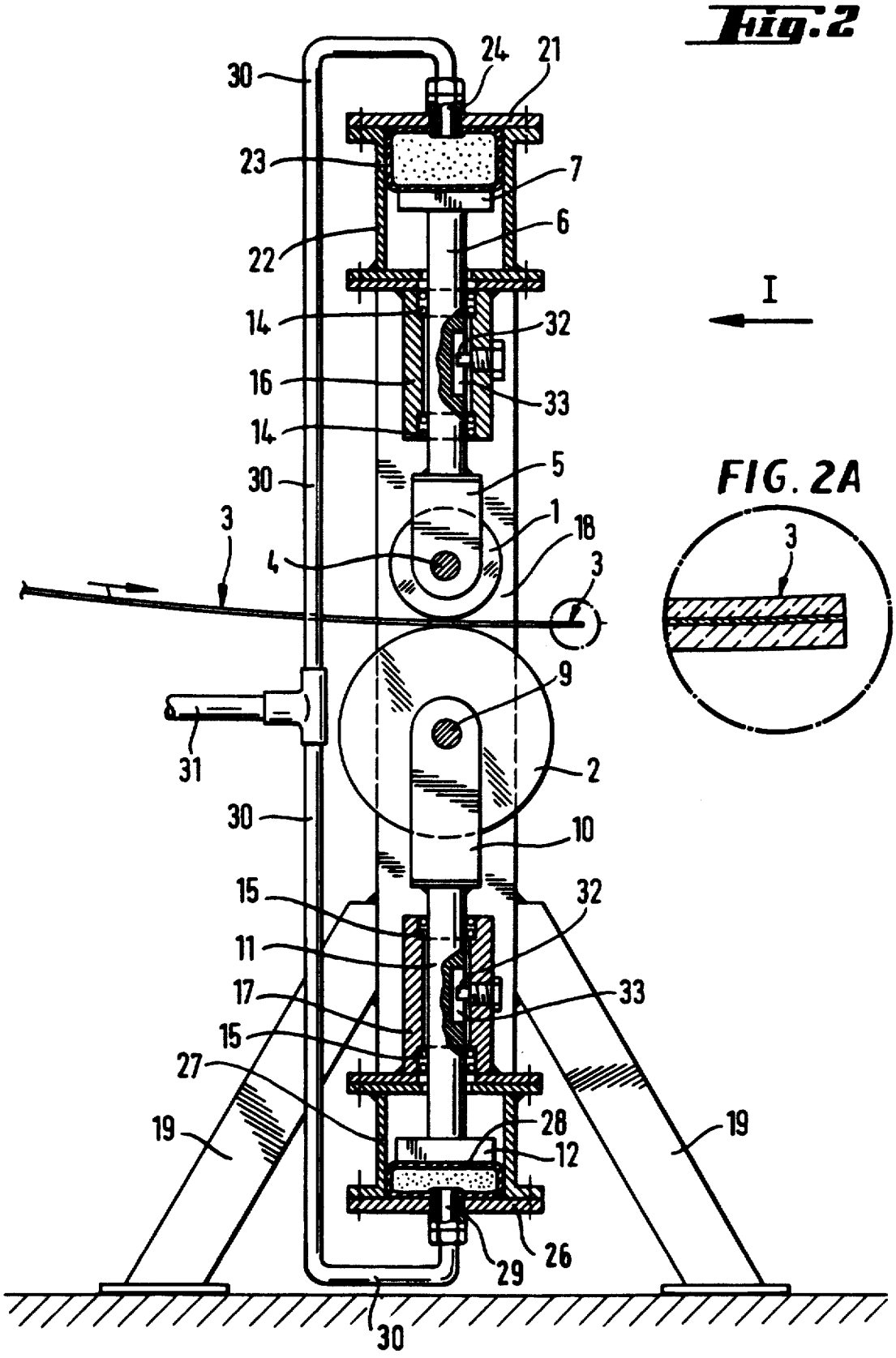
FIG. 2 is a side elevation view in partial section of the calendering device illustrated in FIG. 1.
FIG. 2A is a detail of FIG. 2.

In the case of the calendering device shown in FIGS. 1 and 2, the upper pressure rollers 1 are each mounted in pairs on an axis of rotation 4. The axis of rotation 4 is fixed in its center in a support strip 5 of a pressure roller 1. The support strip 5 is vertically oriented and is mounted on a vertical piston rod 6. At the upper extremity of piston rod 6 is mounted a pressure piston, which has the shape of a pressure plate 7. The counterpressure rollers 2 are mounted in an analogous manner on a short end of common spindle 9 which is fixed at its center in a support strip 10. The support strip 10 is fastened to a piston rod 11 which, at its lower extremity and in the manner of piston, carries a pressure plate 12.

The piston rods 6 and 11 are prevented from turning by, for example, a screw 32 and a slot 33, and are mounted for sliding very freely in ball guide-sleeves 14, 15. The ball guide-sleeve 14 for the piston rods 6 of the pressure rollers are mounted in a common casing 16. In an analogous manner, the ball guide-sleeves 15 for the piston rods 11 of the counterpressure rollers are mounted in a common casing 17. The two casings 16, 17 are fastened to common vertical pillars 18 which, in turn, are respectively provided with bases 19.

A pneumatic casing 22, closed by a closing plate 21, is connected to casing 16 holding the ball guides 14 and is bolted to this casing 16. The piston rods 6 of all the pressure rollers 2 movably extend into this pneumatic casing 22. Between the pressure plates 7 mounted on these piston rods 6 and the closing plate 21, a closed hollow body 23 is arranged inside the casing 22 in the form of a flexible hose and is formed of very elastic rubber. Instead of being formed by a flexible hose, the hollow body can also be formed by the closing plate 21 and a rubber diaphragm that is tightly squeezed between the casing 22 and the closing plate 21. The hollow body 23 is joined to a connecting pipe 24 for the admission of compressed air. Under the effect of the compressed air, the hollow body 23 expands, applies itself against all the pressure plates 7 arranged side-by-side and exerts the same pressure on all the pressure plates 7.

The counterpressure rollers 2 are also actuated by pressure in a manner similar to that for pressure rollers 1. The pneumatic casing 27, closed by plate 26, is joined to casing 17 which defines the ball guide-sleeves 15 for the piston rods 11 carrying the counterpressure rollers 2. The piston rods 11 provided with pressure plates 12 extend into this pneumatic casing 27. Between pressure plates 12 and plate 26, a closed hollow body 28 is arranged inside pneumatic casing 27 in the form of a flexible hose and is formed of very elastic rubber. The hollow body 28 is joined to hose coupling 29. A pipe 30 connects the two feeder couplings 24 and 29 and thus the two hollow bodies 23 and 28 to each other, so that an equalization of pressure is continually established between them. The pipe 30 is connected to an adjustable source of compressed air by means of conduit 31.

Figure 3:
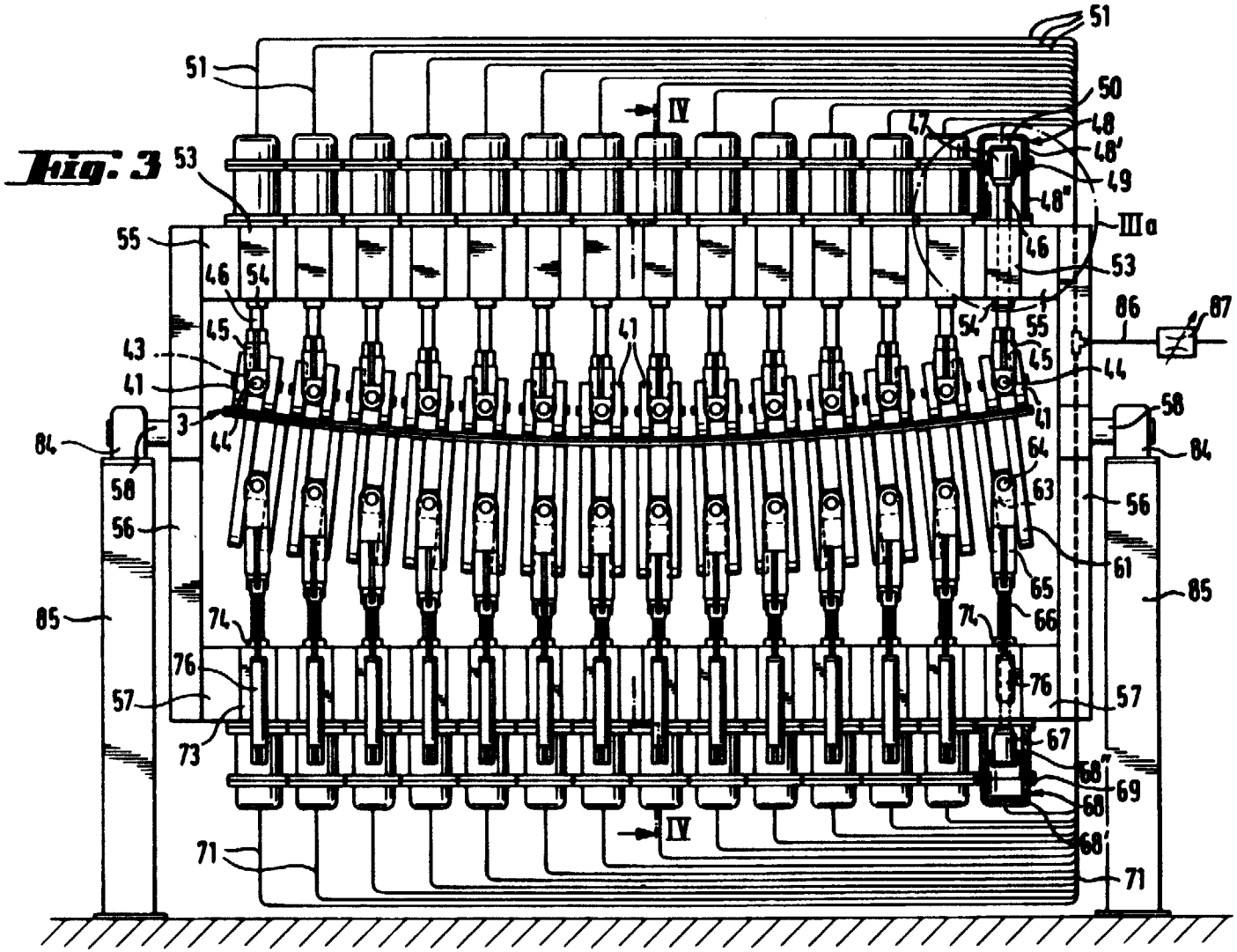
FIG. 3 is a front vertical section of the calendering device of the invention, in which each piston rod carrying a pressure roller at one extremity is individually fitted in a separate, adjustable pneumatic casing.
Figures 4, 4A:
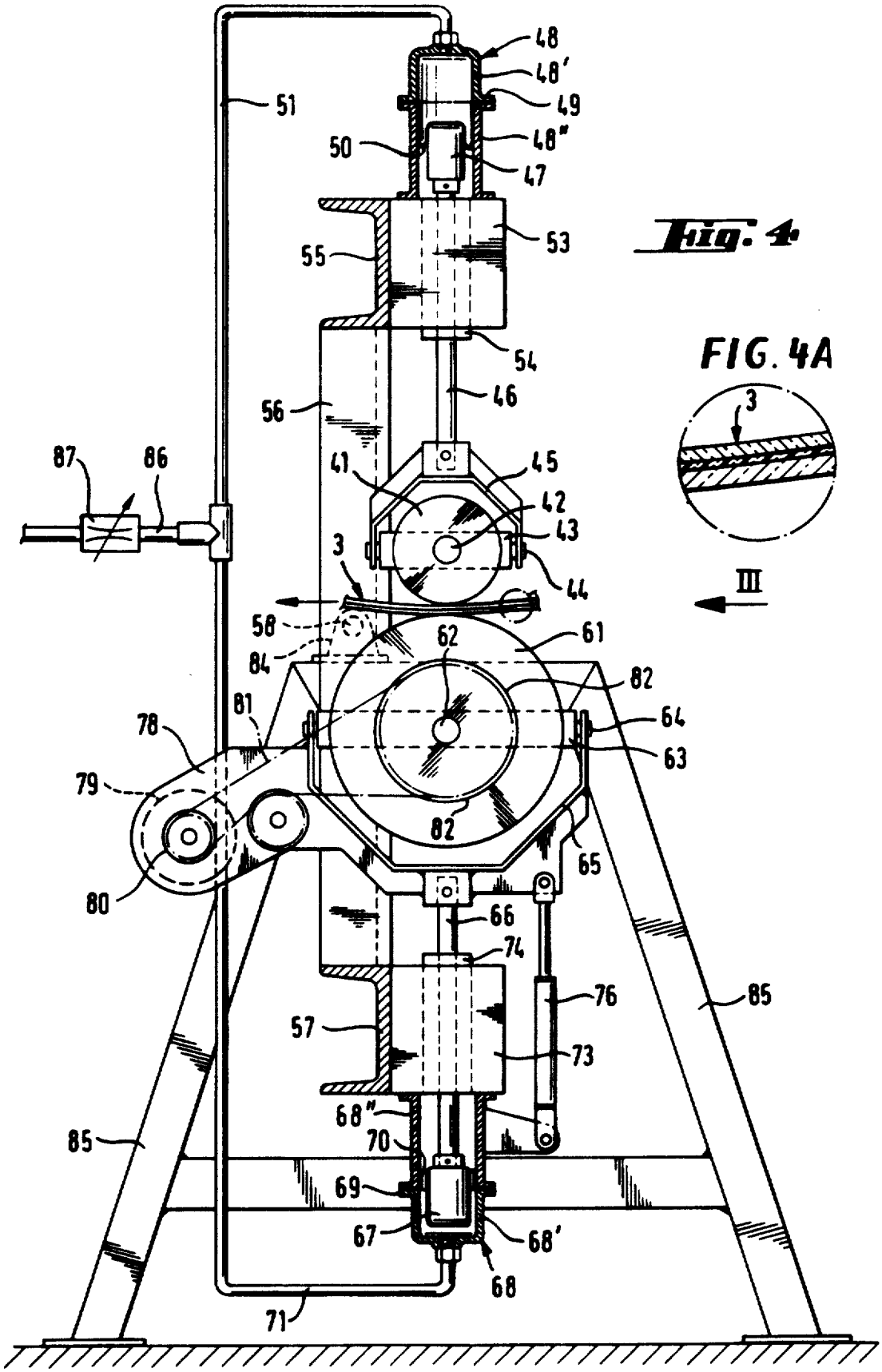
FIG. 4 is a side elevation, in partial section, of the calendering device shown in FIG. 3.
FIG. 4A is a detail of FIG. 4.

In the case of the calendering device illustrated in FIGS. 3 and 4, the pressure rollers 41 are mounted for rotation around the axles 42 which in turn are each mounted in a pivoting piece 43. This pivoting piece 43 is, in turn, mounted for rotation around a pin 44. The pin 44 is mounted in a support yoke 45. The support yoke 45 is mounted at the lower extremity of piston rod 46. A piston 47 is mounted on the upper extremity of piston rod 46 and moves up and down inside pneumatic casing 48 which has the form of a pressure cylinder. The pneumatic casing 48 is formed of two parts 48' and 48" which are bolted to each other by means of a flanged joint 49. A rubber diaphragm 50 is squeezed between the two flanged joints 49. The pneumatic pressure introduced by pressure coupling 51 into the pneumatic casing 48 acts on the diaphragm 50 which transmits the pressure to piston 47.

Figure 3A:
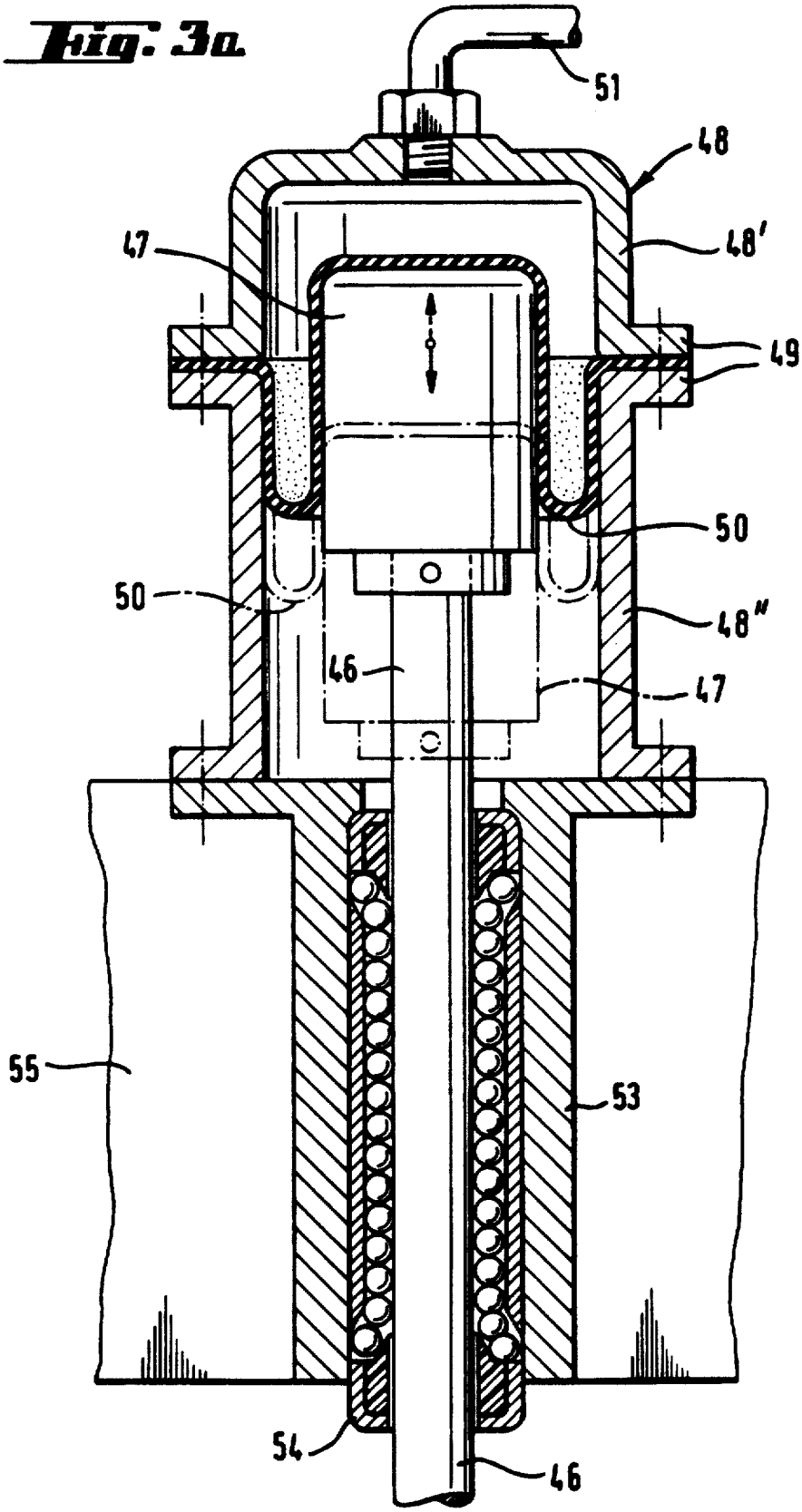
FIG. 3a is a view, on a larger scale, of a detail of FIG. 3.

As shown in FIG. 3a, in particular, it is also possible that in place of a taut diaphragm which expands under pressure action, a diaphragm 50 is used of very flexible rubbery material of a shape and dimension that fits the piston such that no stretching of the diaphragm is required, since this diaphragm 50 is in effect folded about itself. When the piston is moving, it unfolds between the piston and the inside wall of the pneumatic casing. In this case, the distance between the surface of the piston and the inside wall of the cylinder should be such that, during this unfolding operation, the surfaces of diaphragm 50 which move while facing each other do not touch each other. Thanks to this unfolding operation of diaphragm 50, there is also avoided any friction between the surfaces which move towards each other since the "folding" involves a rolling motion.

The pneumatic casing 48 is fastened to a console 53 which also forms the support for a ball guide-sleeve 54. The piston rod 46 glides inside this ball guide-sleeve 54 with a minimum loss due to friction. Means are provided for preventing piston rod 46 from turning around its axis. The individual consoles 53 are arranged side-by-side on a horizontal support crosspiece 55 which, together with the vertical pillars 56 and the lower horizontal support crosspiece 57, form the frame of the machine which is mounted for pivoting in its entirety on horizontal axles 58.

The counterpressure rollers 61 are mounted in a comparable manner. Their axles of rotation 62 are arranged in a pivoting piece 63 which, in turn, is mounted for revolving around pin 64 in yoke 65. The yoke 65 is fastened to the upper extremity of piston rod 66, the lower extremity of which carries the piston 67. Piston 67 moves in the vertical direction inside pneumatic casing 68 which again is in the form of a pressure cylinder and which is constituted of two parts 68' and 68" joined by a joint 69. A very elastic and greatly expandable diaphragm 70 is squeezed between the two flanges of joint 69 and transmits the pneumatic pressure into the pneumatic casing 68 through feed pipe 71. The diameter of piston 67 is again smaller than the inside diameter of pneumatic casing 68 to such an extent that despite the insertion of diaphragm 70 between the piston and the inside wall of pneumatic casing 68, a friction-free movement of piston 67 inside the pneumatic casing 68 will be possible. That is, the structure and operation of piston 67 and diaphragm 70 correspond to that of piston 47 and diaphragm 50. The pneumatic casing 68 is mounted on a console 73 which at the same time forms the assembly support for the ball guide-sleeve 74 in which the piston rod 68 slides in a friction-free manner and without being able to turn around its axis. The consoles 73 are mounted side-by-side on the horizontal support crosspiece 57 of the frame of the pivotable machine.

Due to their own weight, the equipment elements move in the vertical direction, so that the pressure roller 41 and the counterpressure roller 42 always occupy a position at the lower extremity so long as they are not lifted up into a higher position by the product 3 to be laminated by calendering. After the passage of a product 3 to be laminated, they therefore descend to their lowermost position and are partially raised by the rigid sheet of product 3 to be laminated. In this manner, supplementary curving forces act on the sheet of glass. To avoid submitting the sheet of glass to such stresses, a pneumatic spring 76 is arranged between the yoke 65 and the console 73, this spring being dimensioned or set in such a manner that the weight of the movable elements is compensated. Advantageously, a pneumatic spring 76 with a linear working curve is used. Thanks to the presence of pneumatic spring 76, the adjustment forces—in the case of a change of position of the pressure rollers—are extremely weak, so that the adaptation of the top position of the pressure rollers to the shape of the glass sheet is effected solely upon the intervention of the glass sheet that is introduced between the rollers, and requires no additional adjustment measure. After the passage of the glass sheet between the pairs of rollers, the pressure rollers remain in the top position which they occupy by virtue of the action of the raised glass sheet.

Certain ones of the counterpressure rollers 61, for example, two of them, are rotatably driven to transport the product 3 between the pressure rollers. Such a revolving carrying mechanism is illustrated in FIG. 4. A support plate 78 is mounted on yoke 65 and carries a drive motor 79. The toothed drive wheel 80 drives a drive chain 81 which transmits the movement of rotation to a toothed wheel 82 mounted coaxially on counterpressure roller 61 and rigidly joined to it. Thus the rotation of the drive motor 79 rotates the rollers 61 to advance a product 3.

The bearings 84 carrying the pivoting axes 58 of the frame of the machine are mounted on appropriate pedestals 85.

The pressure coupling 51 terminating in each pneumatic casing 48 is connected directly to a pressure coupling 71 which terminates at one pneumatic casing 68 so that the same pneumatic pressure always acts on pressure rollers 41 and on counterpressure rollers 61 cooperating therewith. A separate pressure coupling 86 feeds each set of the pressure couplings 51 and 71 with compressed air. A pressure reducing valve 87 is arranged in each pressure coupling 86, by means of which the pressure therein can be adjusted. Separate sets of pressure coupling pressure reducing valves are provided for each cooperating pair of pressure rollers and counterpressure rollers arranged side-by-side. In this manner, the pressure obtaining in each set of two rollers acting in opposite directions to each other can be regulated independent of the neighboring sets of pressure rollers, so that different compression pressures can be set along the width of the calendering device.

Figure 5:
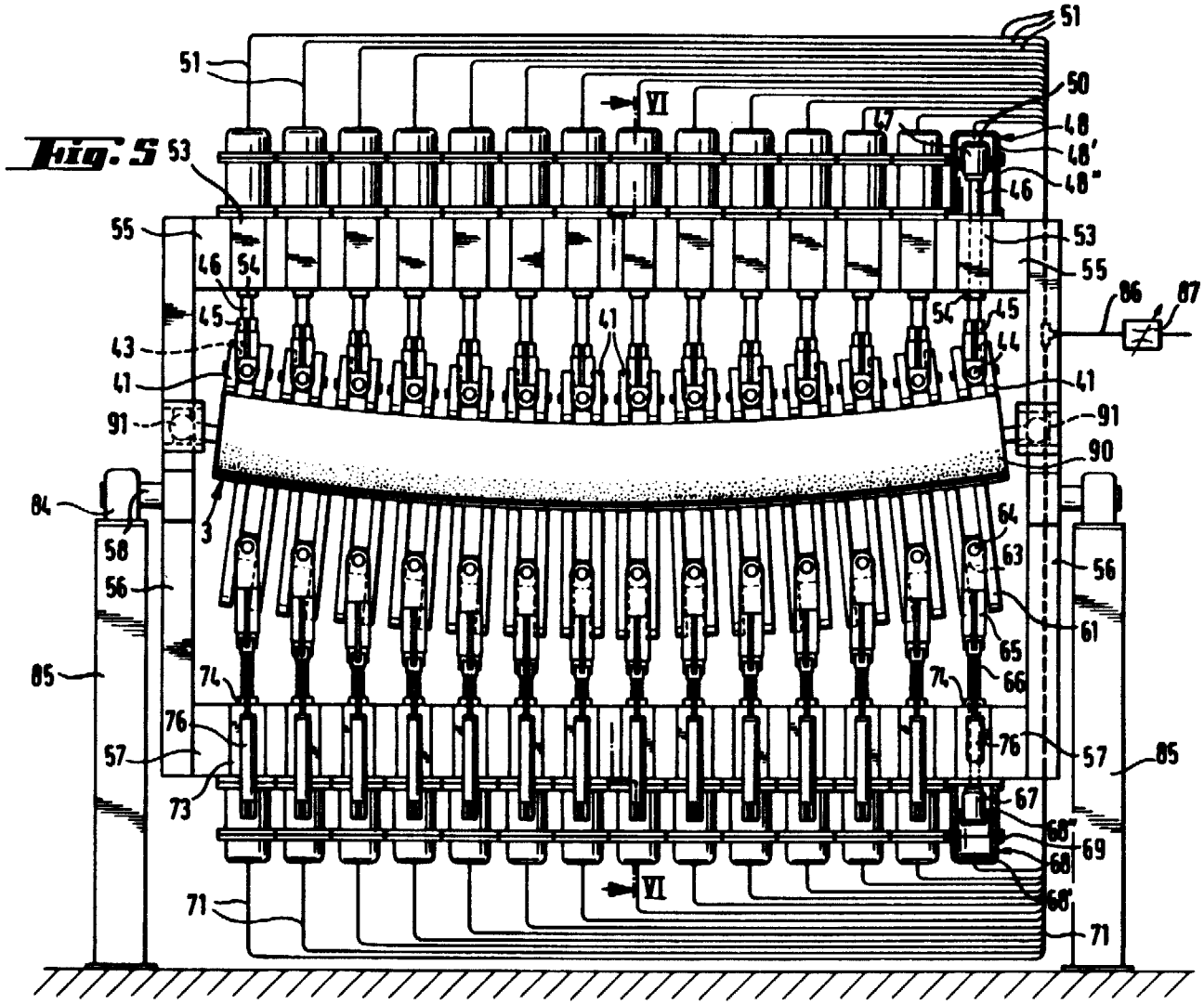
FIG. 5 is a front vertical section of another calendering device showing the same basic structure, but using an elastically deformable continuous cylindrical body arranged under the pressure rollers to uniformly distribute the pressure.
Figures 6, 6A:
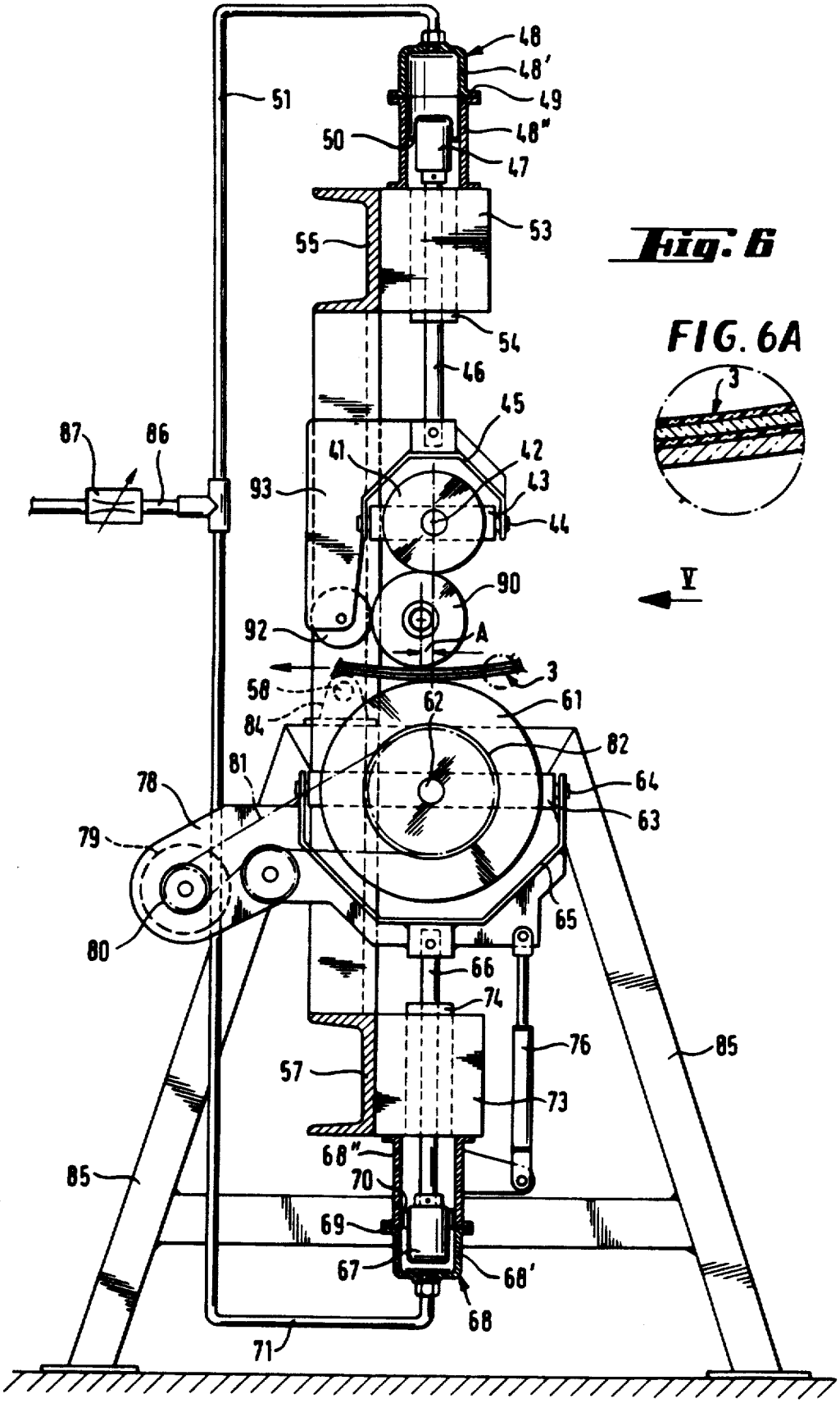
FIG. 6 is a side elevation in partial section of the calendering device shown in FIG. 5.
FIG. 6A is a detail of FIG. 6.

The calendering device illustrated in FIGS. 5 and 6 is constructed precisely as that illustrted in FIGS. 3 and 4, insofar as the arrangement and mounting of pressure rollers 41 and counterpressure rollers 61 are concerned, as well as the configuration of pistons 47 and 67, pneumatic casings 48 and 68, diaphragms 50 and 70, weight compensation pneumatic springs 76 and the revolving drive using drive motor 79. The supply of pressure to pneumatic casings 48 and 68 by the pressure couplings 86, 51 and 71 is also effected in the same manner, with the pneumatic pressure adjustable to the desired value in each set of two elements working in opposite directions, independent of the neighboring systems. This is done in each case by means of a pressure reducing valve 87.

Contrary to the embodiments described above, the pressure rollers 41 do not, however, act directly on the product 3, but rather, a continuous cylindrical body 90 is inserted between the pressure rollers 41 and the product 3. The cylindrical body 90 is made of an elastically deformable material, whose elastic deformation capacity is so great that it can appropriately adapt itself to the shape of the glass sheet. The cylindrical body 90 is supported at its two extremities by suitable thrust bearings 91 in such a manner as to be unable to slide laterally. It is so mounted without being secured and is held in its position by support rollers 92 which are mounted to revolve on support arms 93 behind the calendering device, which support arms in turn are mounted on the yokes 45 carrying the pressure rollers 41. The support rollers 92 are dimensioned and arranged in such a manner that the central axis of the cylindrical body 90 is set off by the distance A behind the plate determined by the axes of rotation of the pressure rollers and counterpressure rollers, respectively. A stable positioning of cylindrical body 90 is thusly obtained.

The cylindrical body 90 serves to uniformize the pressure forces exerted by the pressure rollers 41 on the product 3 in such a manner that a more uniform surface pressure is exerted on this product. This is particularly important when the product-to-be-laminated 3 is constituted by a sheet of glass or a film of plastic material on which a relatively soft layer of plastic material is to be applied as an anti-splintering coating or, in the case of a substrate of plastic material, as a covering layer to improve the resistance against scratches and scores.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A calendering device comprising:

a frame;

a plurality of pressure rollers mounted side-by-side in first direction;

a plurality of counterpressure rollers mounted side-by-side in said first direction, each of said counterpressure rollers being positioned for cooperation with one of said pressure [rollres] *rollers* to form a plurality of pairs of cooperating pressure and counterpressure rollers;

piston rod means for separately supporting each of said pressure rollers and counterpressure rollers;

means for moving each said piston rod means in a second direction so that said rollers of each said pair of rollers move toward one another to calender a product therebetween, said means for moving comprising:

(a) *at least one pair of* first and second fixed fluid tight casings fixed to said frame, (b) an elastic diaphragm for each said fixed casing tightly dividing each said fixed casing into two portions, (c) means for supplying pressurized fluid to one of said two portions of each said fixed casing, (d) [a plurality of pistons] *at least one piston* in the other of said two portions of each said fixed casing, [all of said pistons] *said at least one piston* in *each* said first fixed casing being fixed to said piston rod means of said pressure rollers and engaging said diaphragm in said first fixed casing such that movement of said diaphragm due to fluid pressure in said one of said two portions of said first fixed casing presses [all of said pistons]*said at least one piston* in *each* said first fixed casing to move a corresponding pressure roller in said second direction, wherein [all of said pistons] *said at least one piston* in *each* said second fixed casing [are] *is* fixed to said piston rod means of said counterpressure rollers and [engage] *engages* said diaphragm in said second fixed casing such that movement of said diaphragm due to fluid pressure in said one of said portions of said second fixed casing presses [all of said pistons] *said at least one piston* in *each* said second fixed casing to move a corresponding counterpressure roller in said second direction, wherein said [piston] *pistons* are spaced from any walls of said *at least one* fixed casing; [and]

*means for compensating for movements of said rollers and piston rod means due to the weight thereof,* means for equalizing the pressure between said diaphragms, *and*

*ball guide sleeve means for guiding movement of said at least one piston with low friction,*

*wherein said pressure rollers are positioned above said counterpressure rollers, and wherein for said pressure rollers the means for supplying pressurized fluid supplies the pressurized fluid to only an upper one of said portions of each said casings.*

2. The device of claim 1, wherein *each of* said [diaphragm] *diaphragms* comprises an elongated hose, said one of said two portions of said fixed casing comprising the interior of said hose.

* * * * *